(12) United States Patent
Millberg

(10) Patent No.: US 11,110,869 B2
(45) Date of Patent: Sep. 7, 2021

(54) VEHICLE LOAD CARRIER

(71) Applicant: Thule Sweden AB, Hillerstorp (SE)

(72) Inventor: Victor Millberg, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 146 days.

(21) Appl. No.: 16/467,825

(22) PCT Filed: Sep. 22, 2017

(86) PCT No.: PCT/EP2017/074116
§ 371 (c)(1),
(2) Date: Jun. 7, 2019

(87) PCT Pub. No.: WO2018/114072
PCT Pub. Date: Jun. 28, 2018

(65) Prior Publication Data
US 2021/0094476 A1    Apr. 1, 2021

(30) Foreign Application Priority Data

Dec. 20, 2016 (EP) .................................. 16205369

(51) Int. Cl.
*B60R 9/052* (2006.01)
*B60R 9/058* (2006.01)

(52) U.S. Cl.
CPC .............. *B60R 9/052* (2013.01); *B60R 9/058* (2013.01)

(58) Field of Classification Search
CPC ......... B60R 9/052; B60R 9/058; B60R 9/045; B60R 9/04; B60R 9/05
See application file for complete search history.

(56) References Cited

U.S. PATENT DOCUMENTS 3,554,416 A * 1/1971 Bott ........................ B60R 9/045
224/321
4,343,419 A * 8/1982 Mareydt ................... B60R 9/04
224/326
(Continued)

FOREIGN PATENT DOCUMENTS

CN    2769583 Y    4/2006
CN    1865045 A    11/2006
(Continued)

OTHER PUBLICATIONS

International Search Report and Written Opinion for International Application No. PCT/EP2017/074116, dated Oct. 23, 2017, 9 pages.
(Continued)

*Primary Examiner* — Brian D Nash
(74) *Attorney, Agent, or Firm* — Sterne, Kessler, Goldstein & Fox P.L.L.C.

(57) ABSTRACT

A vehicle load carrier includes a load carrying bar. The load carrying bar has a height, a width, and a length and includes a channel having a width, a height, and a length. The channel has a channel floor portion, first and second channel walls, an opening, and a cover arranged to seal a portion of said opening. The channel further includes a first entrance for introducing a fastening member of a load carrying bar accessory. The vehicle load carrier further includes a first end piece arranged to seal said first entrance of said channel. The vehicle load carrier has a tapered lead-in portion at said first entrance to facilitate entry of said fastening member into said channel.

15 Claims, 7 Drawing Sheets

(56) References Cited

U.S. PATENT DOCUMENTS

| | | | | |
|---|---|---|---|---|
| 4,487,349 A | * | 12/1984 | Kudo | B60R 9/12 |
| | | | | 224/322 |
| 4,768,692 A | * | 9/1988 | Schneider | B60R 9/04 |
| | | | | 224/326 |
| 4,842,176 A | * | 6/1989 | Stapleton | B60R 9/04 |
| | | | | 224/326 |
| 4,901,902 A | * | 2/1990 | Stapleton | B60R 9/04 |
| | | | | 224/326 |
| 5,201,487 A | * | 4/1993 | Epplett | B60R 9/058 |
| | | | | 224/309 |
| 5,358,162 A | * | 10/1994 | Hill | B60R 9/045 |
| | | | | 224/316 |
| 6,176,404 B1 | * | 1/2001 | Fourel | B60R 9/052 |
| | | | | 224/309 |
| 2004/0118886 A1 | * | 6/2004 | Mirshafiee | B60R 9/045 |
| | | | | 224/315 |
| 2005/0036848 A1 | * | 2/2005 | Cunningham | F16B 37/045 |
| | | | | 410/104 |
| 2006/0232985 A1 | * | 10/2006 | Wang | F21V 21/092 |
| | | | | 362/425 |
| 2010/0282799 A1 | * | 11/2010 | Hubbard | B60R 9/058 |
| | | | | 224/320 |
| 2010/0308091 A1 | * | 12/2010 | Hubbard | B60R 9/05 |
| | | | | 224/316 |
| 2014/0143990 A1 | * | 5/2014 | Sautter | B60R 9/04 24/68 CD |
| 2014/0158728 A1 | * | 6/2014 | Sautter | B60R 9/058 |
| | | | | 224/323 |
| 2015/0191127 A1 | * | 7/2015 | Sautter | B60R 9/052 |
| | | | | 224/331 |
| 2016/0082892 A1 | * | 3/2016 | Ferman | B60R 9/05 |
| | | | | 224/322 |
| 2016/0280143 A1 | * | 9/2016 | Sato | B60R 9/045 |
| 2016/0362055 A1 | * | 12/2016 | McFadden | B60R 9/058 |
| 2019/0111853 A1 | * | 4/2019 | Bergman | B60R 9/05 |
| 2019/0270414 A1 | * | 9/2019 | Dellock | B60R 9/058 |
| 2020/0148126 A1 | * | 5/2020 | Griffith | B60R 9/045 |
| 2020/0148127 A1 | * | 5/2020 | Borghi | B60R 9/058 |

FOREIGN PATENT DOCUMENTS

| | | |
|---|---|---|
| DE | 19708906 A1 | 10/1997 |
| DE | 102014208683 A1 | 8/2015 |
| EP | 2746108 A1 | 6/2014 |
| EP | 2746600 A1 | 6/2014 |
| WO | 8904775 A1 | 6/1989 |
| WO | 9603294 A1 | 2/1996 |
| WO | 2009038479 A1 | 3/2009 |
| WO | 2009038480 A1 | 3/2009 |

OTHER PUBLICATIONS

European Search Report for EP Application No. 16205369.8, dated Feb. 27, 2017, 2 pages.

Office Action and Search Report for Chinese Application No. 201780078033.X, Chinese Patent Office, dated Feb. 7, 2020, 15 pages.

Office Action for Chinese Application No. 201780078033.X, Chinese Patent Office, dated Jul. 3, 2020, 12 pages.

* cited by examiner

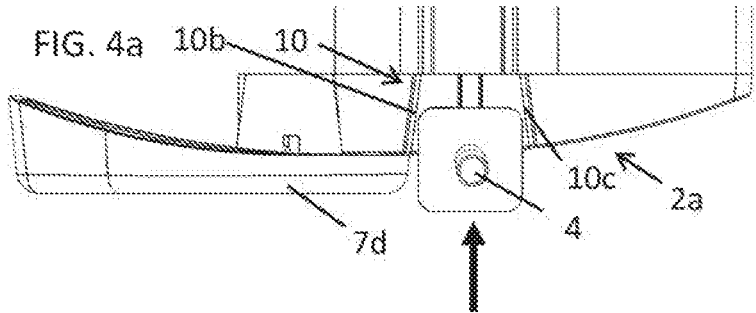
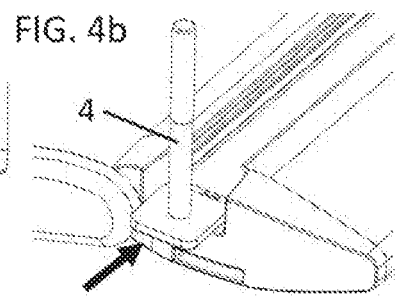
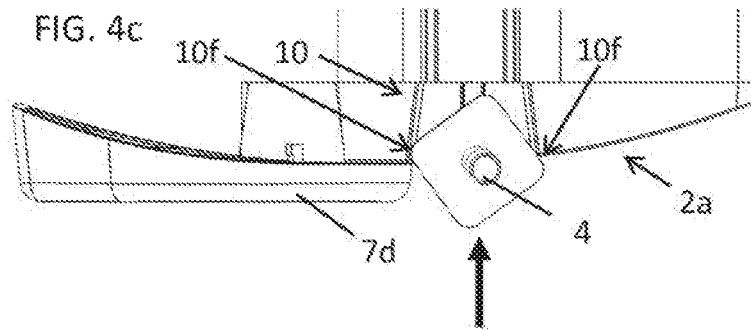
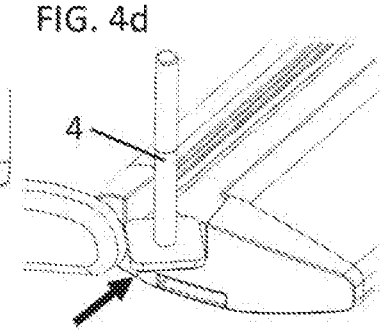
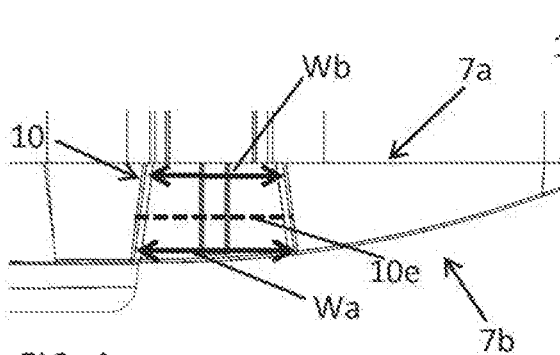
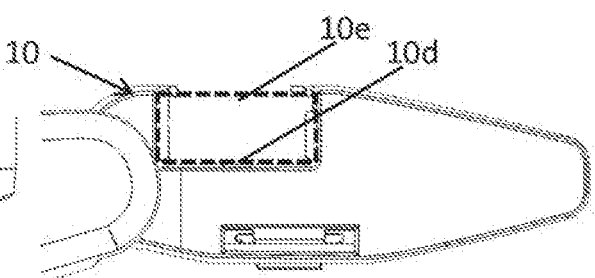

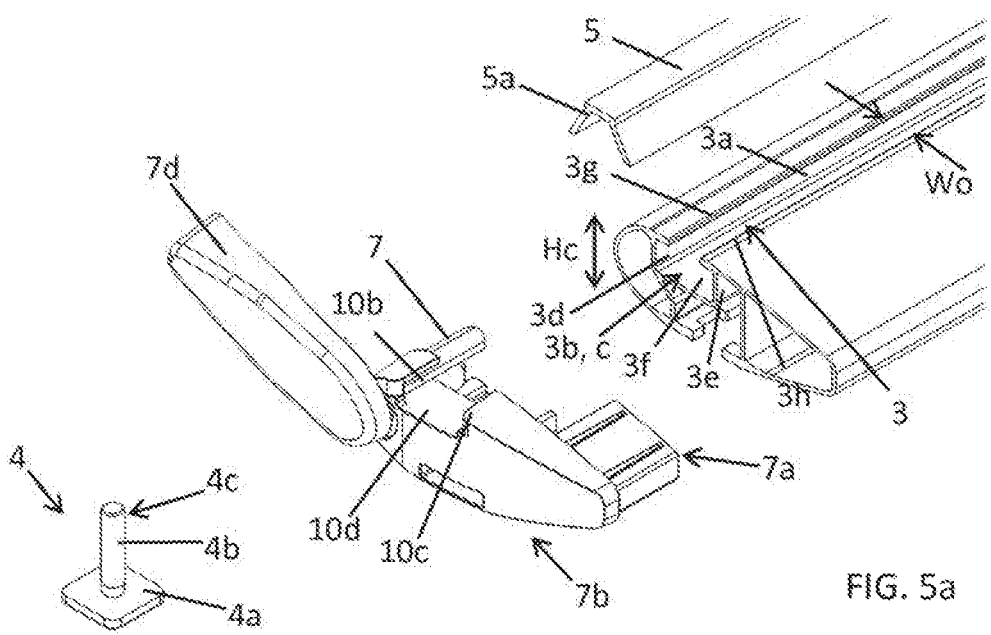
FIG. 5a
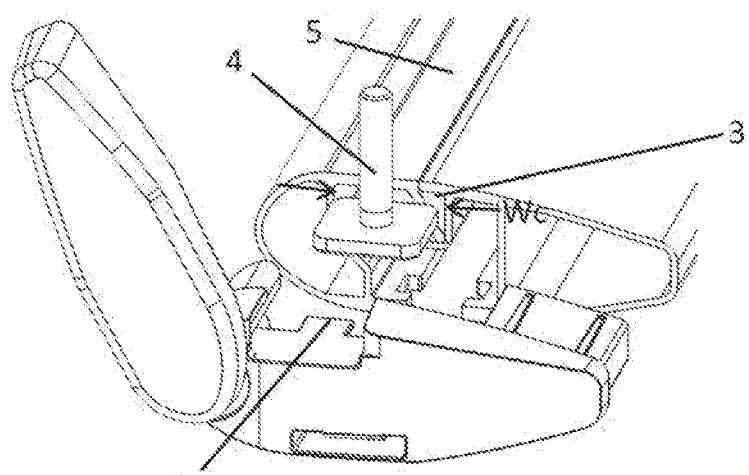
FIG. 5b
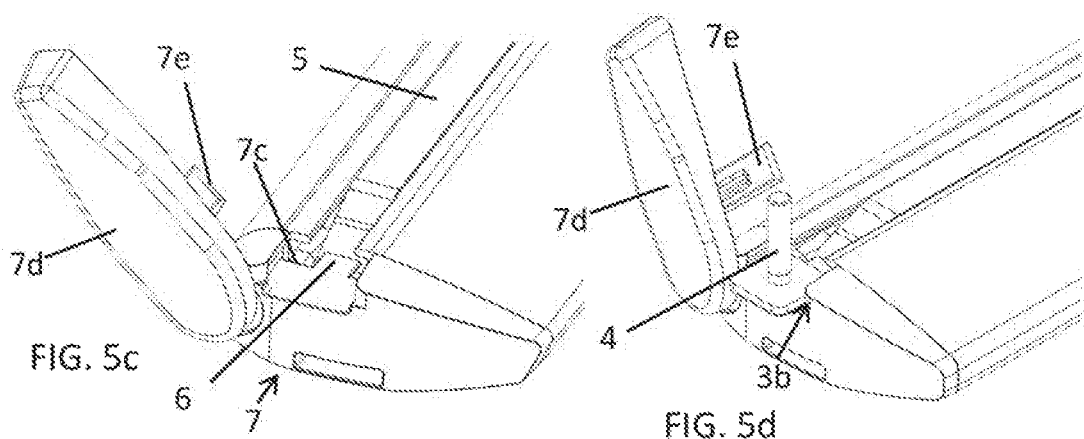
FIG. 5c
FIG. 5d

VEHICLE LOAD CARRIER

TECHNICAL FIELD

The present invention relates to a vehicle load carrier comprising a load carrying bar. The load carrying bar has a height, a width and a length and it comprises a channel having a width, a height and a length and the channel has a channel floor portion, first and second channel walls, an opening and a cover arranged to seat at least a portion of said opening. The channel further comprises at least a first entrance for introducing a fastening member of a load carrying bar accessory. The vehicle load carrier further comprises at least a first end piece arranged to seal said first entrance of said channel. The vehicle load carrier has a tapered lead-in portion at said first entrance to facilitate entry of said fastening member into said channel.

BACKGROUND

Roof racks comprising load carrying bars mounted to the roof an of automobile via load carrier feet are commonly used to provide for an improved load capacity on automobiles, see FIG. 1a. During recent years, a trend has been that the cross section of the load carrying bars have been improved to reduce wind resistance and noise. One type of improved load carrying bars has a wing like cross section having a low wind resistance and low noise level.

To attach load carrying bar accessories, such as a bike carrier, to a load carrying bar having a wing like cross section, the load carrying bar is generally equipped with a channel. The channel extends along the length of the load carrying bar and permits a fastening member to be slid along the channel and into position. The fastening member can be a screw for example. Such channels are however associated with problems such as wind turbulence increasing the wind noise and wind resistance. The channels can also collect dirt or rubble, which in turn accidentally could damage the lacquer of the automobile.

To solve these problems, load carrying bars have been provided with covers also known as cover infills, inserts or sealing strips. One load carrying bar comprising a cover to reduce air turbulence around a channel in the load carrying bar is known from the International publication No. WO 2009/038479 A1. The cover disclosed in this document is adapted to be deformed in vertical direction to permit access to the channel of the load carrying bar.

A problem with covers that are inserted into the channel arises when an accessory is to be mounted on a pair of load carriers. Accessories can be roof mounted bike carriers, ski carriers, roof boxes, carrier baskets and more. A common mounting interface is the use of threaded bolts with flat base, also known as T-bolts. These bolts are attached to the underside of accessory mounts and the bolts are slid into channels of load carrying bars from the side of the load carrying bars, see FIG. 3. The accessories can be mounted with the bolts attached or the bolts positioned in the load carrying bars in advance and the accessories positioned over the bolts subsequently. In either way, the bolts are entered from the channel ends at the sides of the load carrying bars. The cover has normally been positioned along the channel in advance. Often an accessory has two, three or even more bolts that need to be inserted into the channel.

When inserting the bolts, the bolts need to be aligned properly with the channel of the load carrying bar, see FIG. 1b. The base of the bolt is often rectangular and have a width slightly narrower than the width of the channel. Hence, the bolt need to be rotated so the base is aligned to fit the width of the channel and the stem must be essentially vertical to enable the base to fit in the channel. When mounting the accessory with the bolts on the accessory, the user needs to align all the bolts with the channels on the load carrying bars in the front and rear of the vehicle. It can be quite cumbersome as the bolts tend to tilt in different directions and rotate so the base is not aligned with the channel entrance.

Furthermore, when introducing the bolt to the channel, the cover must not obstruct the entrance and may have to be pressed down or to the side. Where the cover needs to be compressed manually by the user, he or she can do so typically with a finger or a hand tool such as a flat screw driver.

In the case with a single compressible insert at the bottom of the channel, the user must compress the insert while also aligning the flat part of the bolt between the compressed cover and the upper part of the channel. The user must also align the shaft of the bolt with the opening of the channel. The flat part of the bolt, often square shaped, must also be rotated into alignment with the channel. Often accessories are equipped with multiple bolts, for instance two on a front mount of a bike carrier and one or two on a rear mount of the bike carrier. Hence, while aligning and introducing each bolt, the user must also balance the bike carrier, fastening both the front and rear mounting positions, see FIG. 1c. This can be a quite tricky task requiring significant effort to hold and balance the bike carrier high up in an awkward position not without the risk of dropping one end of the bike carrier into the vehicle body potentially damaging the paint or surface coating.

In the case with two horizontally opposing covers, the bolts need to be aligned with the slit between these two covers and then pressed to overcome the opposing force from the resiliency in the covers.

Alternatively, the user removes the bolts from the bike carrier and introduces the bolts into the channels before positioning the bike carrier over the bolts. However, also this can be a daunting task also requiring efforts when lifting and balancing the entire bike carrier over the roof.

Hence, there is a need for an improved way of mounting accessories, particularly for introducing fastening members into channels of load carrying bars.

SUMMARY

It is an object of the present invention to provide for a solution, or to at least reduce the drawbacks mentioned above, or to provide for a useful alternative. The objects are at least partly met by a first aspect of the present invention comprising a vehicle load carrier comprising a load carrying bar, the load carrying bar having a height H, a width W and a length L. The load carrying bar comprising a channel having a width Wc, a height Hc and a length Lc. The channel having a channel floor portion, first and second channel walls, an opening and a cover arranged to seal at least a portion of the opening. The channel further comprising at least a first entrance for introducing a fastening member of a load carrying bar accessory. The vehicle load carrier further comprising at least a first end piece arranged to seal the first entrance of the channel. The vehicle load carrier has a tapered lead-in portion at the first entrance to facilitate entry of the fastening member into the channel.

The tapered lead-in portion may be at or near the entrance of the channel. The tapered lead-in portion may provide for a narrowing of a lead-in portion in the direction towards a channel entrance, i.e. narrowing of width and/or height. The tapered lead-in portion may be provided in the cover and/or in the load carrying bar and/or in the end piece, preferably in that the tapered lead-in portion is continuous from the end piece to the cover or the load carrying bar. Hence, the tapered lead-in portion may comprise tapered walls and or floor portion in the end piece and continue with tapered walls and or floor portion in the channel and/or with tapered cover. The tapered lead-in portion in the end piece and the load carrying bar and/or cover may have same or different angles of tapering to provide for a broken or unbroken tapered lead-in portion. In other words, the intersection between a wall in the end piece and a wall of the channel of the load carrying bar may be continuous or without having a step in the transition.

The end piece may have a bar end side and a bar end opposing side, the tapered lead-in portion having lead-in walls and a lead-in floor portion extending between the bar end side and the bar end opposing side, and wherein the tapered lead-in portion extends at least partially, preferably completely, between the bar opposing side to the bar facing side. The bar end side may face and end of the load carrying bar and the bar end opposing side may face away from an end of the load carrying bar.

The end piece may further have a lead-in channel having opposing lips or flanges near the top over said lead-in channel or no lips or flanges and thus same width in its opening as the floor portion.

The tapered lead-in portion may be said to have a lead-in cross section spanned between the lead-in walls and the lead-in floor portion, and wherein the cross section decreases along at least a portion of the lead-in portion from the bar end opposing side towards the bar end side of the end piece. Hence, with tapered lead-in portion it is meant that it provides for a narrowing down or going from a wider to a narrower path, channel, cross-section or lead-in portion. Said cross section may decrease between 10 to 50% from its largest to its smallest cross section, preferably between 20 to 40%. The decrease in cross section may come from a narrowing down of a width Wa between said lead-in walls and/or a height of said lead-in floor portion, or a decrease in lead-in floor height or a combination of both.

One or more of the lead-in floor portion and/or the lead-in side walls at the channel facing side may be aligned with one or more of the channel walls and/or the channel floor portion.

The tapered lead-in portion may have a first width Wa at the channel opposing side and a second width Wb between the channel opposing side and the channel facing side, where the first width Wa is greater than the second width Wb, preferably the second width Wb is at or near the channel facing side, the width of the tapered portion preferably narrowing continuously from the channel opposing side to the channel facing side, the second width Wb preferably corresponding to the channel width Wc, preferably the first width Wa is 10 to 30% greater than the second width Wb, more preferably 15 to 25%. For instance, the end piece entrance may have a width of 26 mm between its lead-in walls narrowing down to a channel width of 21 mm.

The cover may be tapered towards an inner wall of the channel, preferably against a channel side wall and/or a channel floor portion of the channel.

The load carrier may further comprise at least a first compression member configured to compress a first end of the cover to generate the tapered lead-in portion 10. The compression member is preferably any from an adhesive, a rivet, a bolt, a screw, an extended rib, a clip or a combination thereof. Hence, the tapering can be the to be mechanically induced. The use of a compression member enables use of a cover having a homogenous cross section. The cover can be compressed using various means and methods, however it is preferable to use small or slim components to achieve the sloped or tapered shape of the cover. A clip can be configured to clamp the at least first end of the cover against the floor portion of the channel. Such a clip can be a U-shaped bracket with a bridge joining two legs, one of the legs introduced over the compressible cover and the other leg bracing against a surface of the load carrying bar such as an internal wall.

The rib or clip may be of a material, thickness and configuration suitable for compressing the cover to a desired level of tapering. The rib or clip is preferably semi-rigid or rigid and the material of the rib or clip may be of plastic or metal or any other material or combination of materials. Preferably the extended rib compresses the cover towards the wall and also preferably the wall is a floor portion of the channel.

In case an extended rib, bracket or clip is used, at least a portion of the extended rib is located at a distance D of 3 to 15 mm into the channel from the at least first entrance of the channel, preferably at a distance D of 5 to 10 mm. The extended rib should be sufficiently long to efficiently compress the cover while not compressing a longer portion of the cover than necessary. It is advantageous to allow the cover to seal as much as possible of the channel opening. The width of the rib may be about half or a third of the width of the channel, optionally between 2 and 10 mm, 3 and 8 mm or 4 and 7 mm.

At least a portion of the extended rib may be located at a distance Cd of 3 to 20 mm into the channel from the at least first entrance of the channel, preferably at a distance Cd of 5 to 15 mm or around 10 mm.

Furthermore, at least a portion of the extended rib may be arranged at a gap of 1 to 6 mm from an interior wall of the channel, preferably 2 to 5 mm, more preferably 3 to 4 mm. The extended rib can extend from one interior side wall to an opposing interior side wall of the channel. The extended rib should be sufficiently distanced from a wall of the channel to efficiently compress the cover while providing a passage to facilitate engagement of the cover, i.e. for the cover to be slid into position between the rib and a wall of the channel.

The channel may comprise at its first entrance a first end portion and wherein the extended rib is arranged at or in a vicinity of the end portion, preferably the extended rib extends into the channel from the first entrance or from a first interior wall of the channel towards a second, opposing interior wall of the channel. The extended rib may be an extension of an inner wall of the load carrying bar, the extension being folded into the channel. The fold can be an extension of a floor portion of the channel or a side wall of the channel, for instance a fold of a segment of the floor portion of the load carrying bar. The extended rib may also be a clip or other member bracing interior walls or attached in other ways at or near the end of the load carrying bar.

The extended rib may be arranged at the end piece at the channel facing side.

The load carrying bar may comprise at least a first end piece at a first entrance of the channel, the end piece comprising a channel facing side, and wherein the extended rib is arranged at the channel facing side. Hence, the extended rib is arranged at and end piece. Positioning of the extended rib may be aided by guiding surfaces of the end piece. A user then only needs to press down the compressible cover, align the end piece and push the end piece into position at the end of the load carrying bar. This provides a cost-efficient, robust solution. The end portion may be located at the end of the load carrying bar. The end piece may close or terminate the channel.

The extended rib may be aligned centrally with respect to a channel width We. This is advantageous for instance where the compressible cover is symmetric.

Furthermore, the height and/or alignment with respect to the channel can be adjusted to fit different covers. This is advantageous as it provides a cost-efficient solution in that adjustment can be made, reducing the number of required load carrying bar and cover variants.

The extended rib may be tapered, preferably towards the channel floor portion and/or in the direction into the channel. This facilitates positioning of the extended rib over infill and thus the mounting of an end piece to the load carrying.

The at least first tapered end of the compressible cover may have been permanently preformed. The compressible cover can be permanently pre-compressed or compressed when mounted, in either way, the cover can be provided with a tapered shape. In the case of permanently preforming, it can be from manufacturing by milling, pressing, cutting or molding. The cross section in its natural, idle, or normal state thus has an inherently tapered or inclined shape towards one or both ends of the cover.

The channel comprises a further, second cover, the first and second covers being arranged in or near the opening of the channel and facing each other together forming the tapered lead-in portion. The first and second covers may be tapered away from each other, the covers preferably being arranged to face each other along the width of the.

The cover may be a cover or a cover strip, e.g. having a hollow, solid, sheet-like or foam structure.

The tapered lead-in portion may form a conical shape, such as mainly a U or V shape.

The load carrier may comprise a cover configured to conceal a hole, void or opening created by the at least first tapered end of the compressible cover, preferably wherein the cover is configured pivotally to the load carrying bar. This is advantageous in that a hole formed by the tapered end of the cover is covered. In addition to cover the hole to prevent moist, dirt from entering and sound from being generated, the cover also ensures that the fastening member is not positioned too close to the end of the load carrying bar ensuring secure attachment of the load carrying bar accessory.

Furthermore, a transversal rib may be arranged at the at least first end entrance of the channel blocking the cover in a direction of the entrance of the channel. Preferably, the transversal rib is arranged to block a channel end at least at a height of 3-5 mm, preferably 4 mm, from a channel floor portion. The transversal rib may be part of an end piece connectable to an end of the load carrying bar, for instance by providing a raised floor portion on the end piece. This provides an efficient cover slide stop, particularly when sliding a fastening member in the channel along the cover.

According to one aspect of the present invention, a system may be provided comprising a vehicle load carrier according the first aspect of the present in invention and a fastening member having a base and a stem, the stem having at its free end a threaded portion, the base arranged to fit in the channel and the stem in the opening of the channel, the base preferably being rectangular and the stem preferably having a circular cross section.

The cover may have a first and a second end and at least a first of the first and second ends of the cover may be tapered to allow unobstructed entry of the fastening member from the at least first entrance. It is understood that the tapered at least first end of the cover is tapered in its use position, as the tapering of the compressible cover be provided by a pre-pressing of the cover and facilitates entering of fastening members. This can also be expressed as having an cover pre-pressed inside a load carrying channel for receiving a fastening member of a load carrying bar accessory. The user does not need to compress the cover as the tapered end of the cover provides room for covering the fastening member. It also provides an inclined guiding surface for the fastening member to slide upon. This frees a hand of the user, which can be used for lifting and balancing the accessory. The cover may be tapered or essentially towards an inner wall of the channel, preferably against a floor portion of the channel.

The channel may extend along the entire length of the load carrying bar. The channel may also extend partially along the length of the load carrying bar, the at least first entrance of the channel then being located at the end of the channel. Thus, the channel entrance may be at an end of the load carrying bar. The channel entrance may also be anywhere along the load carrying bar at a distance from an end of the load carrying bar. The channel entrance may be a wider opening of the channel, for instance as a continuation of the channel, allowing a fastening member to be introduced into the wider opening and slid over the tapered end of the cover into the channel.

The compressible cover may be tapered towards one or both its ends. The cover may be positioned in the channel such that the tapering deflects away from the channel opening. The optimal angle of the tapered section may be selected based on channel depth and characteristics of the fastening member to be covered. The fastening member is preferably slidingly entered into the channel from one of its ends. Tapering is to be construed as the compressible cover having a decreased or narrowing cross section.

The vehicle load carrier may comprise a load carrying bar and two feet for mounting on a roof of a vehicle. The load carrying bar may be for a roof rack. The vehicle load carrier may also comprise a load carrier basket having one or more load carrying bars as side walls or between side walls sectioning the load carrier basket.

BRIEF DESCRIPTION OF THE DRAWINGS

Non-limiting embodiments of the present invention will be described in greater detail and with reference to the accompanying drawings in which;

FIGS. 4a to 4d show a fastening member and an end of a load carrying bar according to one aspect of the present invention with views from above and from a perspective respectively;

FIGS. 4e and 4f show close-up views of the end piece according to one aspect of the invention with views from above and in perspective respectively;

FIG. 5a shows a detailed, exploded view of an end of a load carrier with a view in perspective;

FIGS. 5b to 5d illustrates the procedure of positioning a fastening member with views in perspective;

DETAILED DESCRIPTION OF PREFERRED EMBODIMENTS

Figure 1A:
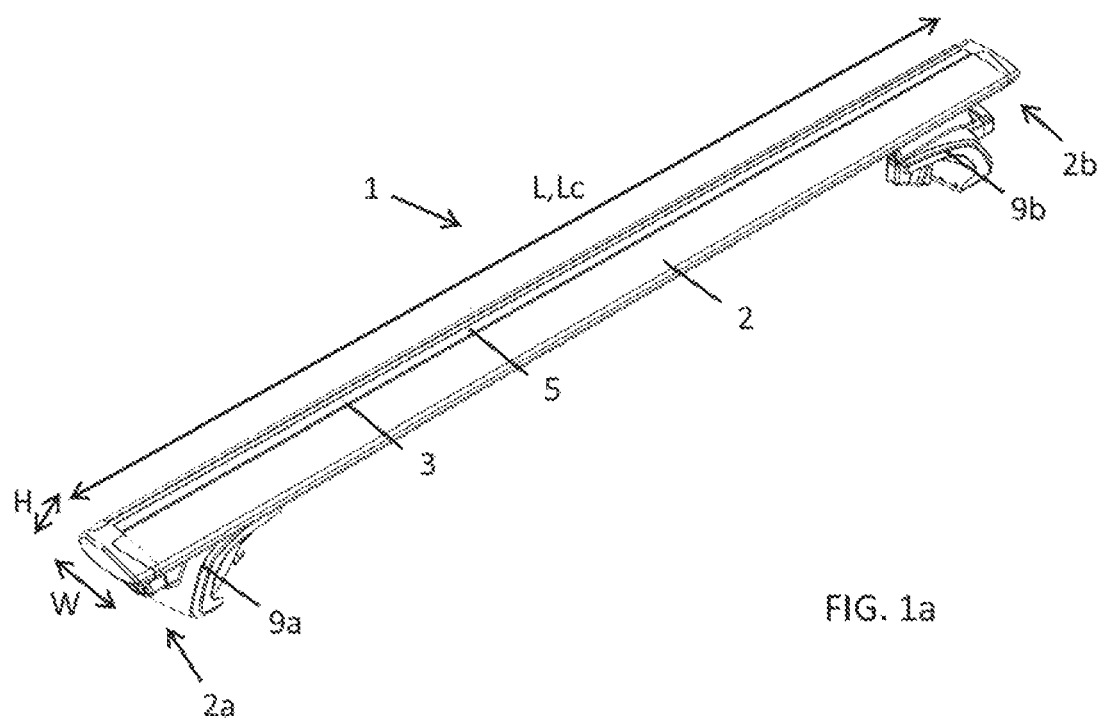
FIG. 1a shows a load carrier with a view in perspective.
Figure 1B:
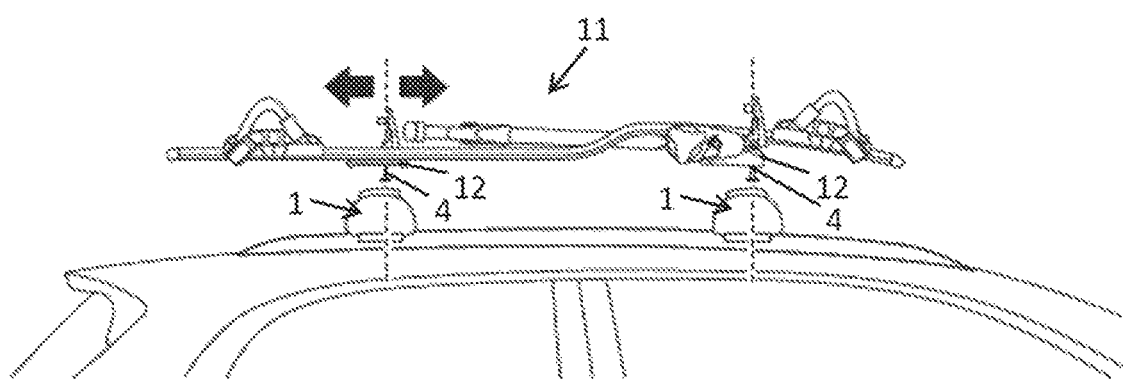
FIG. 1b shows an accessory positioned over a pair of load carriers on a vehicle roof viewed from the side of the vehicle.
Figure 1C:
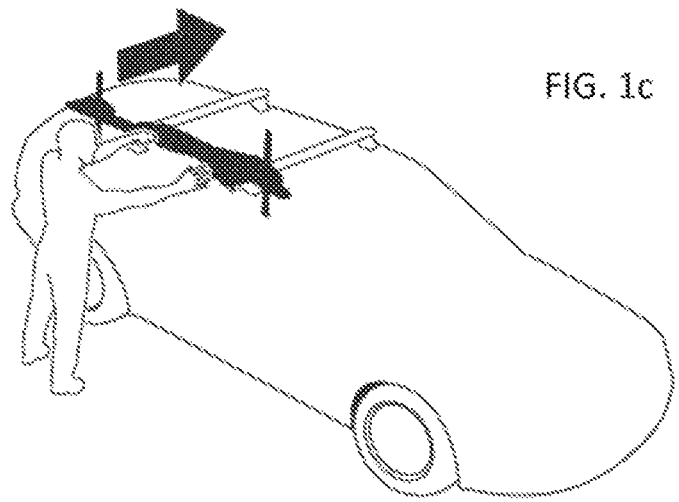
FIG. 1c shows a user mounting an accessory onto a pair of load carriers with a view in perspective.
Figure 1D:
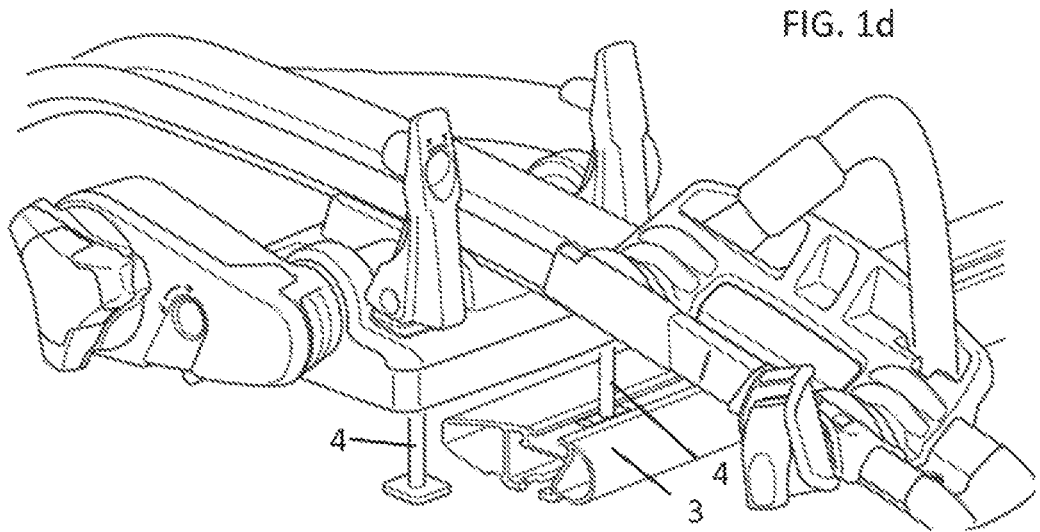
FIG. 1d shows a close-up of an end of a load carrying bar and a front end of a bike carrier with a view in perspective.
Figure 1E:
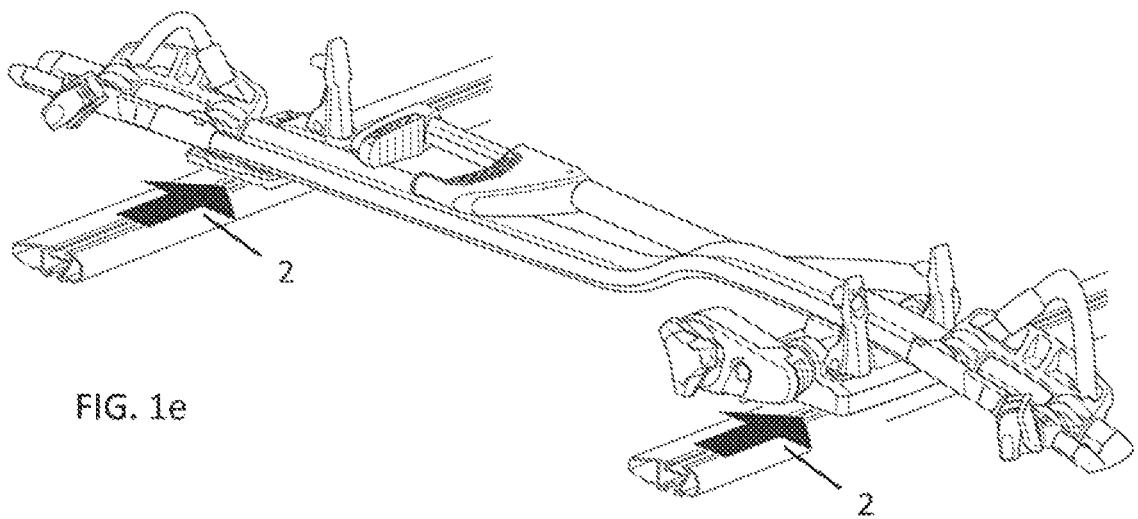
FIG. 1e shows a bike carrier mounted to a pair of load carriers with a view in perspective.
Figure 2A:
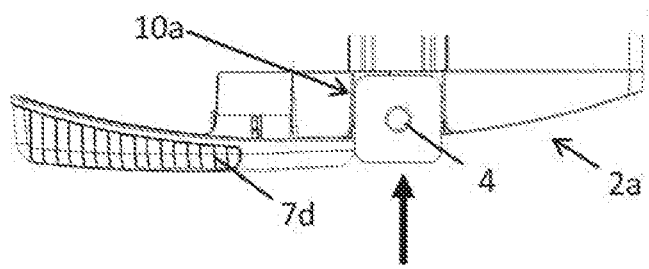
FIGS. 2a to 2d show a fastening member and an end of a load carrying bar according to prior art with views from above and from a perspective respectively.
Figure 2B:
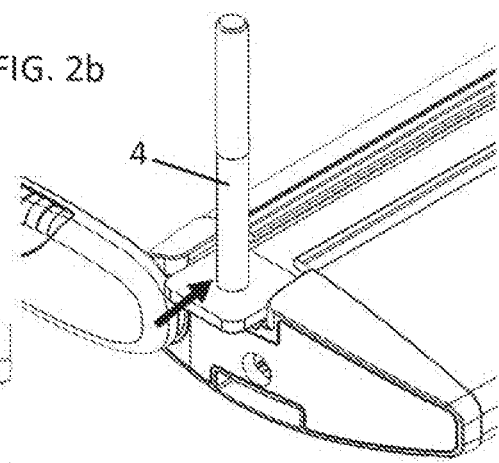
Figure 2C:
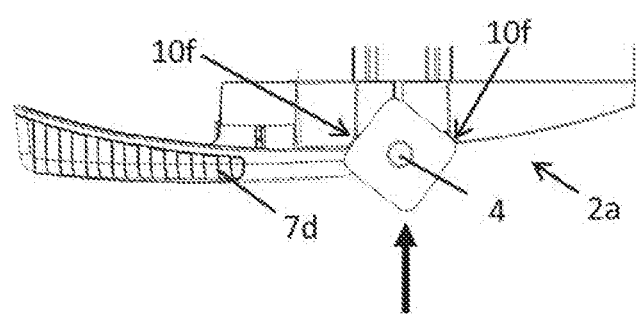
Figure 2D:
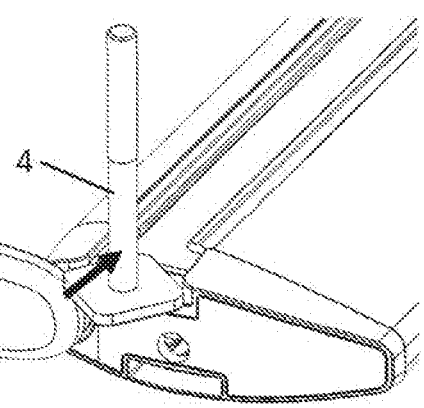

FIG. 1a) shows a load carrier 1 having a load carrying bar 2. Two load carrier feet 9a and 9b support the load carrier bar 2 when mounted on the roof of a vehicle (not shown). The load carrying bar 2 has a length L and a width W. Along the length of the load carrying bar 2 and extending between its ends 2a and 2b, it has an elongated channel 3. The elongated channel 3 has an opening facing away from the vehicle roof when said load carrier 1 is mounted on a vehicle. The channel 3 has a width Wc, a height Hc and alength Lc. The load carrying bar 2 has at its first and second ends 2a and 2b first and second end pieces 7. Along the channel 3 is a cover 5 sealing the opening to prevent dirt and moisture from entering the channel.

Views b) to e) of FIG. 1 illustrate the mounting procedure of a load carrier accessory, in this case a bike carrier 11.

View b) of FIG. 1 shows a bike carrier 11 above a pair of vehicle load carriers 1 and a portion of a vehicle roof seen from the side. The front of the vehicle is towards the right in the illustration. The bike carrier 11 is seen having front and rear mounting brackets (12) aligned with front and rear vehicle load carriers 1 respectively. Protruding from the mounting brackets (12) on the underside of the bike carrier are T-bolt fasteners 4, the broken lines and arrows indicating how the fasteners 4 must be aligned with the load carriers 1. Views c) and e) of FIG. 1 indicate how a user should slide the bike carrier 11 along the load carrying bars 2 when the T-bolts 4 have been properly engaged with the channels 3 of the load carrying bars 2. View d) of FIG. 1 shows how the T-bolts 4 are entered into the channel 3 of the load carrying bar 2. In these views, the load carrying bars 2 are shown without end pieces 7, although end pieces 7 may also be attached to the ends 2a, 2b of the load carrying bars while mounting the bike carrier 11 when the end caps 7d of the end pieces 7 have been opened to provide access to the lead-in portion or lead-in channel 10 in the end pieces 7.

When mounting the bike carrier 11 on a load carrier 1, it must be lifted to the height of the load carrier 1 mounted on the roof of a vehicle. The bike carrier 11 may weigh a few kilograms and the height it must be lifted to may be 160 cm or more, on Sports Utility Vehicles (SUV:s) often to a level above the user's head. The user then needs to simultaneously align the fasteners 4 at front and rear of the bike carrier 11 with the channels 3 on the load carrying bar 2. An additional difficulty is that the fasteners 4 can wobble, twist and turn while maneuvering the bike carrier assembly 11. While holding the bike carrier 11 with one hand, the user must adjust each of the fastening members 4 for proper alignment with the channels 3 on both load carrying bars 2. This mounting procedure can be effort demanding, requiring strength to manage the weight and careful aligning.

Figure 3:
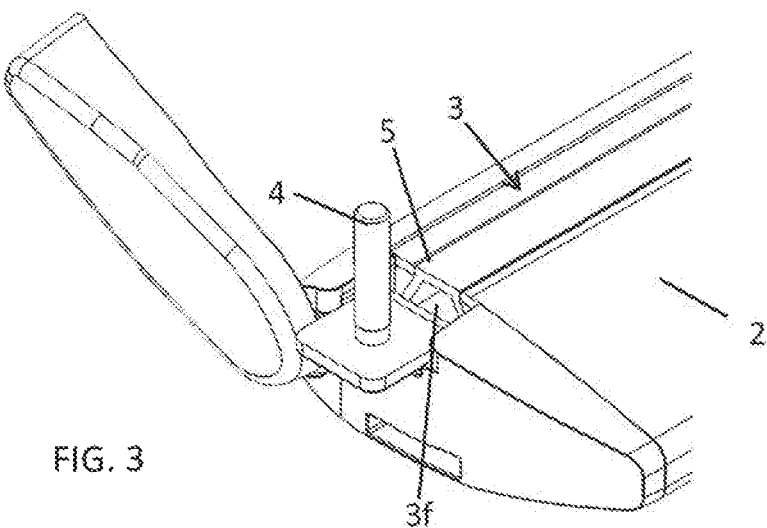
FIG. 3 shows an end portion of an exemplifying prior art load carrier bar with a view in perspective.

FIGS. 2 and 3 illustrate problems with prior art load carrying bars 2. Views a) and c) of FIG. 2 show an end portion 2a of a load carrying bar 2 from above and views b) and d) of FIG. 2 show the same end portion 2a from a perspective. Views c) and d) of FIG. 2 shows how a T-bolt is obstructed and blocked against channel lead-in corners 10f at an end piece of a load carrying bar 2. FIG. 3 shows how a T-bolt is obstructed by an insert 5 of a load carrying bar 2. FIGS. 2 and 3 will be described in more detail in the following.

Views a) to d) of FIG. 2 show an exemplifying a prior art vehicle load carrier 1 where a fastening member or T-bolt 4 is being inserted into the channel 3 of the load carrying bar 2 via a channel lead-in portion 10a of an end piece 7. Arrows indicate the direction force is applied to the T-bolt 4 for pushing or moving it into and along the channel 3. Views a) and b) show a T-bolt 4 being perfectly aligned with a channel lead-in portion 10a in an end piece 7. Views a) and b) illustrate how careful the alignment of the T-bolt must be to avoid having the base of the T-bolt hitting against corners 10f of end piece 7 at the channel lead-in 10a as the width of the base 4a of the fastening member 4 is only slightly narrower than the width of the channel 3. Views c) and d) show a T-bolt 4 not properly aligned with the channel lead in portion 10a in the end piece 7. Here, sides of the base 4a of the T-bolt 4 engage with corners 10f of the entrance to the channel lead-in portion 10a in the end piece 7. Pushing the T-bolt 4 further in the direction of the arrow will not help and the T-bolt 4 must be withdrawn and aligned property.

FIG. 3 shows an end portion 2a, 2b of an exemplifying prior art load carrier bar 2 having a channel 3 with an insert 5 obstructing the passage of a T-bolt 4. To introduce the T-bolt 4 into the channel 3, the user must first compress the insert 5 towards the channel floor portion 3f.

Figure 5E:
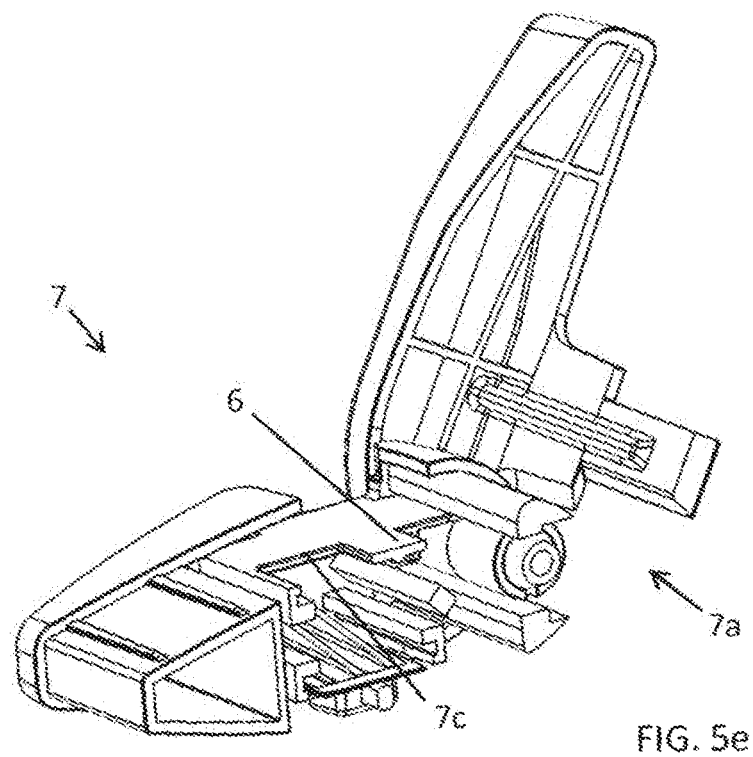
FIGS. 5e and 5f show details of an end piece according to one embodiment of the invention with views in perspective and a cross section respectively.
Figure 5F:
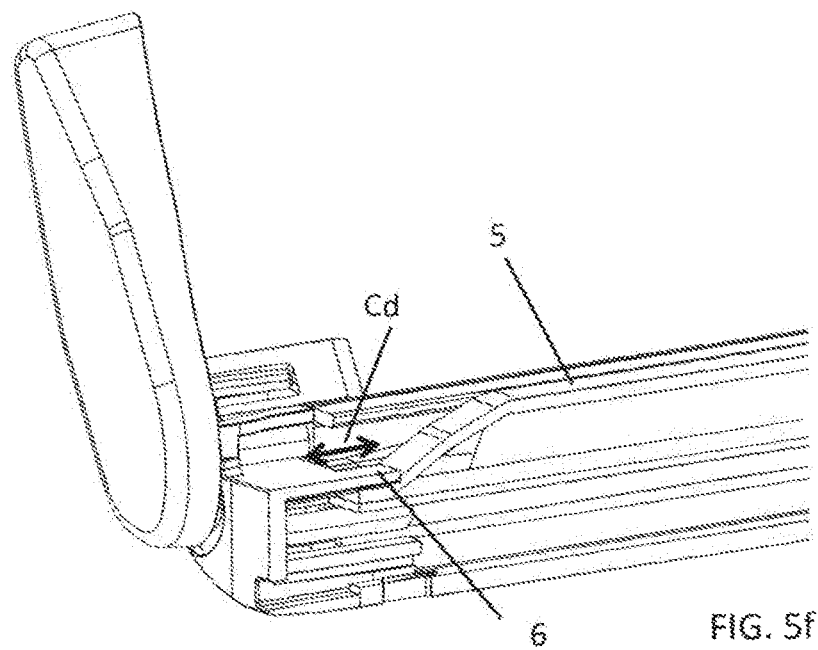
Figure 5G:
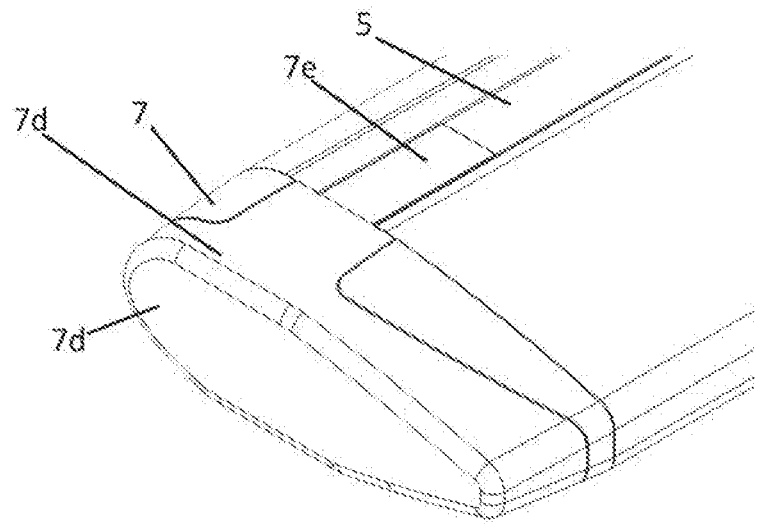
FIG. 5g shows an end piece and a cover tab according to the present invention with a view in perspective.
Figure 6:
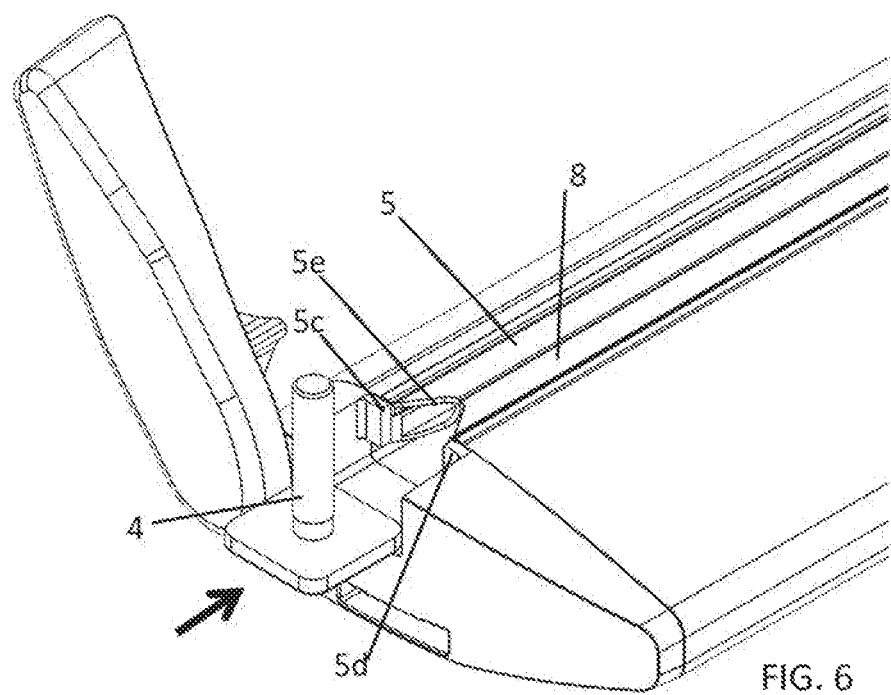
FIG. 6 shows a load carrying bar with a cover according to one embodiment of the present invention with a view in perspective.

FIGS. 4 to 6 illustrate various exemplifying embodiments according to the present invention and will be described in more detail in the following.

Views a) to d) of FIG. 4 illustrate a first exemplifying embodiment where a fastening member or T-bolt 4 is inserted into the channel 3 of a load carrying bar 2 via a channel lead-in portion 10a of an end piece 7. The channel lead-in portion 10a is tapered, meaning that the walls 10a, 10b narrows towards the channel 3 of the load carrying bar 2 in the direction of the arrow. Although not shown, also the floor portion 10d of the lead-in portion 10 can be tapered to further ease entering of the T-bolt 4 as the lead-in entrance is widened in all directions, reducing the degree of precision when introducing the T-bolt to the lead-in entrance. Arrows indicate the direction the T-bolt 4 is pushed or moved. Views a) and b) show a T-bolt 4 being perfectly aligned with a channel lead-in portion 10a in the end piece 7. In views a) and b), it is seen that there are small gaps between the base of the T-bolt 4 and the walls 10a, 10b of the lead-in portion 10a of the end piece 4. Views c) and d) show a T-bolt 4 not perfectly aligned with the channel lead-in portion 10a in the end piece 7. However, instead of being blocked at the entrance, there is sufficiently room to receive the base 4a of the T-bolt 4 despite its improper alignment with the channel lead-in portion 10a. A first corner 10f of the T-bolt base 4a engages with a first wall of the channel lead-in portion, and a first edge of the T-bolt base 4a engages with a first corner 10f of the end piece 7 at the entrance to the channel lead-in portion 10a. As the T-bolt 4 is moved further in the direction of the arrow, the first corner of the T-bolt base 4a will slide against the wall 10b of the lead-in portion 10a and thus cause the base 4a to rotate into alignment with the channel 3 of the load carrying bar 2.

Views 4e) and 4f) show close-up views of the end piece 7 having a tapered lead-in channel portion. The tapered lead-in portion 10 has a first width Wa at the bar end opposing side 7b and a second width Wb between said bar end opposing side 7b and the bar end facing side 7a, where the first width Wa is greater than the second width Wb. It is seen how the width of the tapered portion is continuously narrowing from the bar end opposing side to the bar end facing side 7a where the second width Wb is identical to or slightly less than the width Wc of the channel. Also indicated is a lead-in cross section 10f, spanned between the lead-in walls 10b and 10c and the lead-in floor portion 10d.

FIG. 5 illustrates a second exemplifying embodiment according to the present invention which will be described more in detail in the following.

View a) of FIG. 5 shows close-up view of an end piece 7 and an end of a load carrying bar 2. The channel has a floor portion 3f, a front channel wall 3d and a rear channel wall 3e, an opening 3a and a cover 5 arranged to seal the opening. The channel 3 further comprises an entrance 3b and a T-bolt 4 about to be entered into the channel 3. The T-bolt 4 can be used for attaching an accessory (not shown) such as a bike carrier, ski carrier, roof box or similar. The load carrying bar 2 has an end piece 7 having a bar end facing side 7a, a bar end opposing side 7b and an end cap 7d that can seal the channel entrance 3b in a closed position. End piece lead-in walls 10b and 10c and floor portion 10d form a tapered lead-in portion 10a next to the channel entrance 3b. The channel 3 may have protruding lips or flanges 3g and 3h near the top for fastening members to brace against and for holding the cover 5 in place, such opposing flanges 3g and 3h of the channel 3 opening defining a width Wo of said opening.

Views b) to d) of FIG. 5 illustrates the procedure of positioning a fastening member 4 into the channel 3 according to an embodiment of the present invention. View 5b) shows an end piece 7 separated slightly from the load carrying bar 2 for a better view of the channel entrance 3b. A fastening member 4 is located just outside the first entrance 3b of the channel 3 and the compressible cover 5 blocks the passage for the fastening member 4 and needs to be pressed down for the fastening member 4 to be introduced into the channel 3. View 5c) shows how a first end 5a of the compressible cover 5 is pressed down at a centrally aligned portion by an extended tab or rib 6. View 5d) shows how fastening member 4 is positioned in a lead-in portion of the end piece at the first channel entrance 3b. After positioning of the fastening member 4, end cap 7d is pivoted to alignment with the end piece 7 and cover tab 7e covers the opening produced by the pressed down cover 5 as seen in view g) of FIG. 5.

Views e) and f) of FIG. 5 show details of the end piece 7 and its cooperation with the load carrying bar 2 and the compressible cover 5. View 5e) shows the end piece 7 from its bar end facing side 7a. It shows the extended rib 6 and a transversal rib 7c having been manufactured in one piece with the end piece 7. Although not shown, it is also possible that the transversal rib 7c is arranged at the load carrying bar, either detachably or permanently with room for entering the compressible cover 5, which however also can be introduced into the opening 3a of the channel 3 from the top of the load carrying bar 2. The transversal rib 7c can extend partially or across the full width of the channel, as long as it prevents the cover 5 from moving past its delimitation. View 5f) shows a cross section of the load carrier 1 along a vertical plane through the center of the channel 3. Extended rib 6 presses down the compressible cover 5.

View g) of FIG. 5 shows how an end cap 7d of an end piece 7 has been pivoted into position to cover a hole generated by the tapered end of the compressible cover 5. When positioned over the hole, the end cap 7d is aligned with the opening 3a of channel 3.

FIG. 6 shows another exemplifying embodiment with first 5 and second 8 elongated, compressible covers 5, 8 facing each other horizontally. Ends of the compressible covers 5 and 7 are shown having tapered cuts 5e creating a V-shaped cut-out into which the fastening member 4 can easily be introduced with significantly less effort than straight cut covers would require. Also seen in FIG. 6 are a pair of protruding wall ribs 5c and 5d arranged to prevent the compressible covers 5 and 8 from sliding out from the channel 3. An arrow indicates the direction the fastening member 4 is moved for entering the channel 3.

The load carrying bar may be made of metal such as steel or aluminum, preferably made by molding or extrusion.

The compressible cover or covers may be hollow or solid, it may be made of rubber, Thermoplastic elastomers (TPE), thermoplastic rubbers, plastic, open-celled foam, closed-celled foam, or a combination thereof. The cover may be made from extrusion or molded. The cross section of the cover may have a general rectangular, circular, U- or V-shape. The fastening member may be a bolt with a head, for instance a flat, convex or hook shaped head, e.g. a T-bolt or T-screw.

A similarly configured channel can also be located any side. e.g. also at the bottom of a load carrying bar, e.g. for mounting load carrier feet for attaching to vehicle.

ITEM LIST

Cd distance to extended rib
H, L, W bar height, length and width
Hc, Lc, Wc channel height, length and width
Hf floor height of lead-in portion
Wa first width of lead-in portion
Wb second width of lead-in portion
Wo Width of channel opening
1 vehicle load carrier
2 load carrying bar
2a and 2b first and second load carrying bar ends
3 channel
3a channel opening
3b and 3c first and second channel entrances
3d first, front-side interior channel wall
3e second, rear-side interior channel wall
3f channel floor portion
3g, h channel flanges
4 fastening member
4a base
4b stem
4c threaded portion
5 first cover
5a and 5b first and second ends of compressible cover
5c and 5d wall ribs
5e Cover tapering
6 compression member, such as extended rib
7 end piece
7a bar end facing side
7b bar end opposing side
7c transversal rib
7d end cap 7e cover tab
8 second compressible cover
9 load carrier foot
10 tapered lead-in portion
10a Lead-in portion
10b first, front side lead-in wall
10c second, rear side lead-in wall
10d lead-in floor portion
10e lead-in cross section
10f channel lead-in corner
11 bike carrier
12 bracket It should be noted that the features described herein can be combined in different ways even though not explicitly mentioned or described in combination. Likewise, combinations of features disclosed herein do not necessarily need to be combined together but could be used alone or in other combinations.

The invention claimed is:

1. A vehicle load carrier comprising:
a load carrying bar, said load carrying bar having a height, a width, and a length, said load carrying bar comprising:
a channel having a width, a height, and a length, said channel having a floor portion, first and second channel walls, an opening, and a cover arranged to seal a portion of said opening, said channel further comprising an entrance for introducing a fastening member of a load carrying bar accessory; and
an end piece arranged to seal said entrance of said channel,
wherein said vehicle load carrier has a tapered lead-in portion at said entrance to facilitate entry of said fastening member into said channel, and
wherein said tapered lead-in portion narrows in width, in height, or both in a direction toward said channel.

2. The vehicle load carrier according to claim 1, wherein said tapered lead-in portion is provided in said cover or in said load carrying bar or in said end piece.

3. The vehicle load carrier according to claim 1, wherein said end piece has a bar end facing side facing said load carrying bar and a bar end opposing side opposite of said bar end facing side, said tapered lead-in portion having lead-in walls and a lead-in floor portion extending between said bar end facing side and said bar end opposing side, and wherein said tapered lead-in portion extends partially between said bar opposing side to said bar facing side.

4. The vehicle load carrier according to claim 3, wherein a lead-in cross section is spanned between said lead-in walls and said lead-in floor portion, and wherein said lead-in cross section decreases along a portion of said tapered lead-in portion from said bar end opposing side towards said bar end facing side of said end piece.

5. The vehicle load carrier according to claim 3, wherein one or more of said lead-in floor portion or said lead-in side walls at said bar end facing side are aligned with one or more of said channel walls or said channel floor portion.

6. The vehicle load carrier according to claim 3, wherein said tapered lead-in portion has a first width at said bar end opposing side and a second width between said bar end opposing side and said bar end facing side, wherein said first width is greater than said second width.

7. The vehicle load carrier according to claim 1, wherein said cover is tapered towards an inner wall of said channel.

8. The vehicle load carrier according to claim 1, wherein said load carrier further comprises a compression member configured to compress an end of said cover to generate said tapered lead-in portion, wherein said compression member is any of an adhesive, a rivet, a bolt, a screw, an extended rib, a clip, or a combination thereof.

9. The vehicle load carrier according to claim 8, wherein a portion of said extended rib is located at a distance of 3 to 20 mm into said channel from said entrance of said channel.

10. The vehicle load carrier according to claim 9, wherein said extended rib is arranged at said entrance.

11. The vehicle load carrier according to claim 8, wherein said extended rib is arranged at said end piece at said bar end facing side.

12. The vehicle load carrier according to claim 1, wherein said channel comprises a second cover, said cover and said second cover being arranged in or near said opening of said channel and facing each other together forming said tapered lead-in portion.

13. The vehicle load carrier according to claim 1, wherein said cover is a cover or a cover strip having a hollow, solid, sheet-like, or foam structure.

14. The vehicle load carrier according to claim 1, wherein said tapered lead-in portion has a U or V shape.

15. A system comprising:
a vehicle load carrier comprising:
a load carrying bar, said load carrying bar having a height, a width, and a length, said load carrying bar comprising:
a channel having a width, a height, and a length, said channel having a floor portion, first and second channel walls, an opening, and a cover arranged to seal a portion of said opening, said channel further comprising an entrance for introducing a fastening member of a load carrying bar accessory; and
an end piece arranged to seal said entrance of said channel; and
a tapered lead-in portion at said entrance to facilitate entry of said fastening member into said channel, wherein said tapered lead-in portion narrows in width, in height, or both in a direction toward said channel; and
said fastening member having a base and a stem, said stem having at a free end a threaded portion, said base arranged to fit in said channel and said stem in said opening of said channel.

* * * * *